United States Patent
Fenchak et al.

(10) Patent No.: US 8,505,660 B2
(45) Date of Patent: Aug. 13, 2013

(54) SHUTTER SYSTEM FOR VEHICLE GRILLE

(75) Inventors: Patrick Joseph Fenchak, Rochester Hills, MI (US); Kim Stuart Wilkinson, Dexter, MI (US)

(73) Assignee: SRG Global, Inc., Warren, MI (US)

( * ) Notice: Subject to any disclaimer, the term of this patent is extended or adjusted under 35 U.S.C. 154(b) by 0 days.

(21) Appl. No.: 13/239,527

(22) Filed: Sep. 22, 2011

(65) Prior Publication Data

US 2012/0074729 A1    Mar. 29, 2012

Related U.S. Application Data

(60) Provisional application No. 61/386,895, filed on Sep. 27, 2010.

(51) Int. Cl.
*B60K 11/00*    (2006.01)

(52) U.S. Cl.
USPC ........................................... 180/68.1

(58) Field of Classification Search
USPC ............. 180/68.1–68.3; 123/41.58, 41.04, 123/41.05, 27 R; 454/73–75; 165/160, 42, 165/44, 271
See application file for complete search history.

(56) References Cited

U.S. PATENT DOCUMENTS

| | | | |
|---|---|---|---|
| 4,064,934 A | 12/1977 | Kolthoff, Jr. et al. | |
| 4,457,558 A | 7/1984 | Ishikawa | |
| 4,534,506 A | 8/1985 | Ishida et al. | |
| 4,753,288 A * | 6/1988 | Harvey | 165/98 |
| 5,732,666 A | 3/1998 | Lee | |
| 5,734,727 A | 3/1998 | Flaherty et al. | |
| 6,174,025 B1 | 1/2001 | Henderson, III et al. | |
| 6,553,719 B1 | 4/2003 | Stone et al. | |
| 6,695,047 B2 | 2/2004 | Brocksopp | |
| 7,498,926 B2 | 3/2009 | Browne et al. | |
| 7,717,208 B2 | 5/2010 | Knauer | |
| 7,757,643 B2 | 7/2010 | Harich et al. | |
| 7,866,737 B2 | 1/2011 | Browne et al. | |

(Continued)

FOREIGN PATENT DOCUMENTS

| | | |
|---|---|---|
| DE | 2908734 A1 | 9/1980 |
| DE | 3151435 A1 | 7/1982 |

(Continued)

OTHER PUBLICATIONS

Corresponding international application—Written Opinion and ISR dated Apr. 30, 2012.

(Continued)

*Primary Examiner* — John Walters
*Assistant Examiner* — James Triggs
(74) *Attorney, Agent, or Firm* — Harness, Dickey & Pierce, PLC

(57) ABSTRACT

An apparatus for use with a vehicle grille may include a frame, a shutter, and a drive mechanism. The shutter may be connected to the frame and may be pivotable relative thereto between a first position and a second position. The shutter may include a pivot axis and an engagement member. The shutter may restrict airflow through a vehicle grille in the first position and allow airflow through the vehicle grille in the second position. The drive mechanism may drive the shutter between the first and second positions. The drive mechanism may include a drive shaft rotating relative to the frame and a drive member engaging the drive shaft and moving linearly relative to the frame. The drive member may include an arcuate slot slidably engaging the engagement member.

20 Claims, 5 Drawing Sheets

(56) References Cited

U.S. PATENT DOCUMENTS

| | | |
|---|---|---|
| 8,091,516 B2 | 1/2012 | Preiss |
| 8,161,919 B2 | 4/2012 | Klotz et al. |
| 2001/0017479 A1 | 8/2001 | Birndorfer et al. |
| 2002/0153182 A1 | 10/2002 | Vaillancourt et al. |
| 2006/0060401 A1 | 3/2006 | Bole |
| 2006/0102399 A1 | 5/2006 | Guilfoyle et al. |
| 2007/0077880 A1 | 4/2007 | Lee et al. |
| 2009/0066096 A1 | 3/2009 | Doroghazi et al. |
| 2009/0140549 A1 | 6/2009 | Doroghazi et al. |
| 2010/0071977 A1 | 3/2010 | Ritz et al. |
| 2010/0083918 A1 | 4/2010 | Tregnago et al. |
| 2010/0139583 A1 | 6/2010 | Klotz et al. |
| 2010/0236503 A1 | 9/2010 | Bernt et al. |
| 2010/0243351 A1 | 9/2010 | Sakai |
| 2010/0243352 A1 | 9/2010 | Watanabe et al. |
| 2010/0282533 A1 | 11/2010 | Sugiyama |
| 2011/0005851 A1 | 1/2011 | Doroghazi et al. |
| 2011/0070817 A1 | 3/2011 | Walters |
| 2011/0073395 A1 | 3/2011 | Lee et al. |
| 2011/0247779 A1 | 10/2011 | Charnesky et al. |
| 2012/0067655 A1 | 3/2012 | Charnesky et al. |
| 2012/0074729 A1 | 3/2012 | Fenchak et al. |
| 2012/0119059 A1 | 5/2012 | Crane et al. |
| 2012/0132474 A1 | 5/2012 | Charnesky et al. |
| 2012/0247018 A1 | 10/2012 | Stokes et al. |

FOREIGN PATENT DOCUMENTS

| | | | |
|---|---|---|---|
| DE | 3929023 | C1 | 9/1990 |
| DE | 3929023 | C1 | 9/1990 |
| DE | 20021023 | U1 | 2/2001 |
| DE | 20021023 | U1 | 2/2001 |
| DE | 102004048038 | A1 | 4/2006 |
| DE | 102006054970 | A1 | 5/2008 |
| DE | 102006054970 | A1 | 5/2008 |
| EP | 2371602 | A1 | 10/2011 |
| FR | 2404557 | A1 | 4/1979 |
| JP | 64018744 | U | 1/1989 |
| JP | 01277616 | A | 11/1989 |
| JP | 2001048058 | A | 2/2001 |
| WO | 2006056359 | A1 | 6/2006 |
| WO | 2007108803 | A1 | 9/2007 |
| WO | WO-2007108803 | A1 | 9/2007 |
| WO | 2011009212 | A1 | 1/2011 |
| WO | WO-2011008253 | A1 | 1/2011 |

OTHER PUBLICATIONS

U.S. Appl. No. 61/213,767, filed Jul. 13, 2009; Doroghazi.

International Preliminary Report on Patentability regarding International Application No. PCT/US2010/001939 issued Jan. 17, 2012.

International Search Report and Written Opinion regarding Application No. PCT/US2012/026428, mailed Nov. 30, 2012.

International Search Report regarding Application No. PCT/US2010/001939 issued on Oct. 6, 2010.

U.S. Office Action regarding U.S. Appl. No. 12/801,403 mailed Aug. 21, 2012.

U.S. Office Action regarding U.S. Appl. No. 13/239,527 mailed Dec. 5, 2012.

* cited by examiner

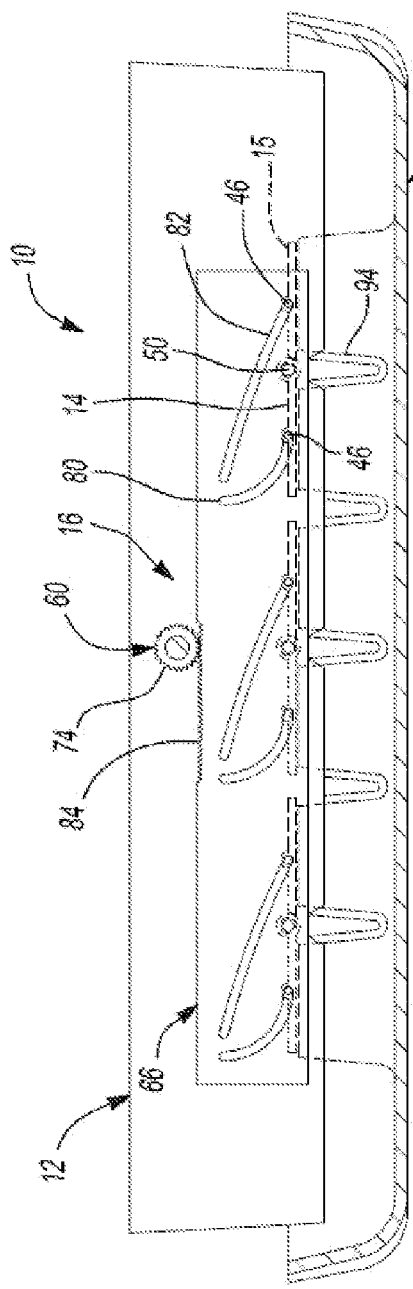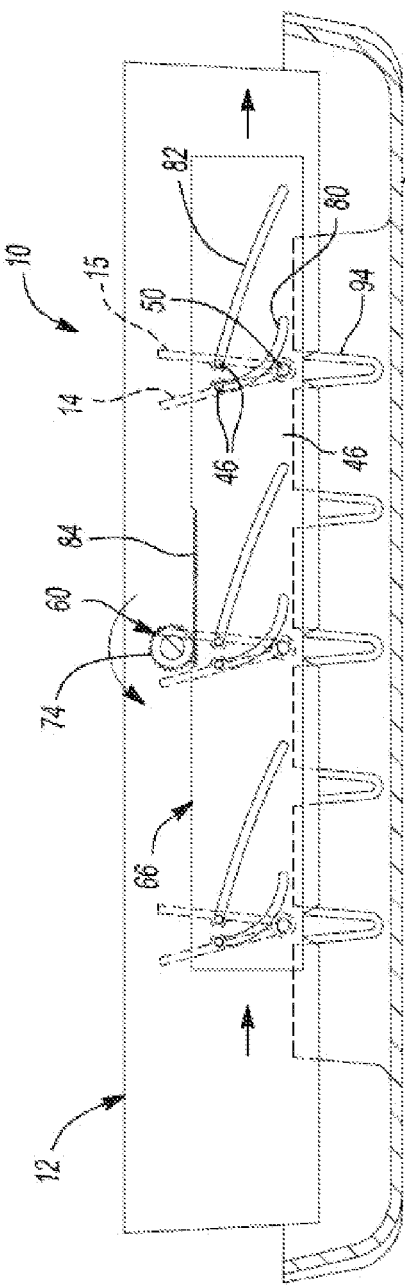

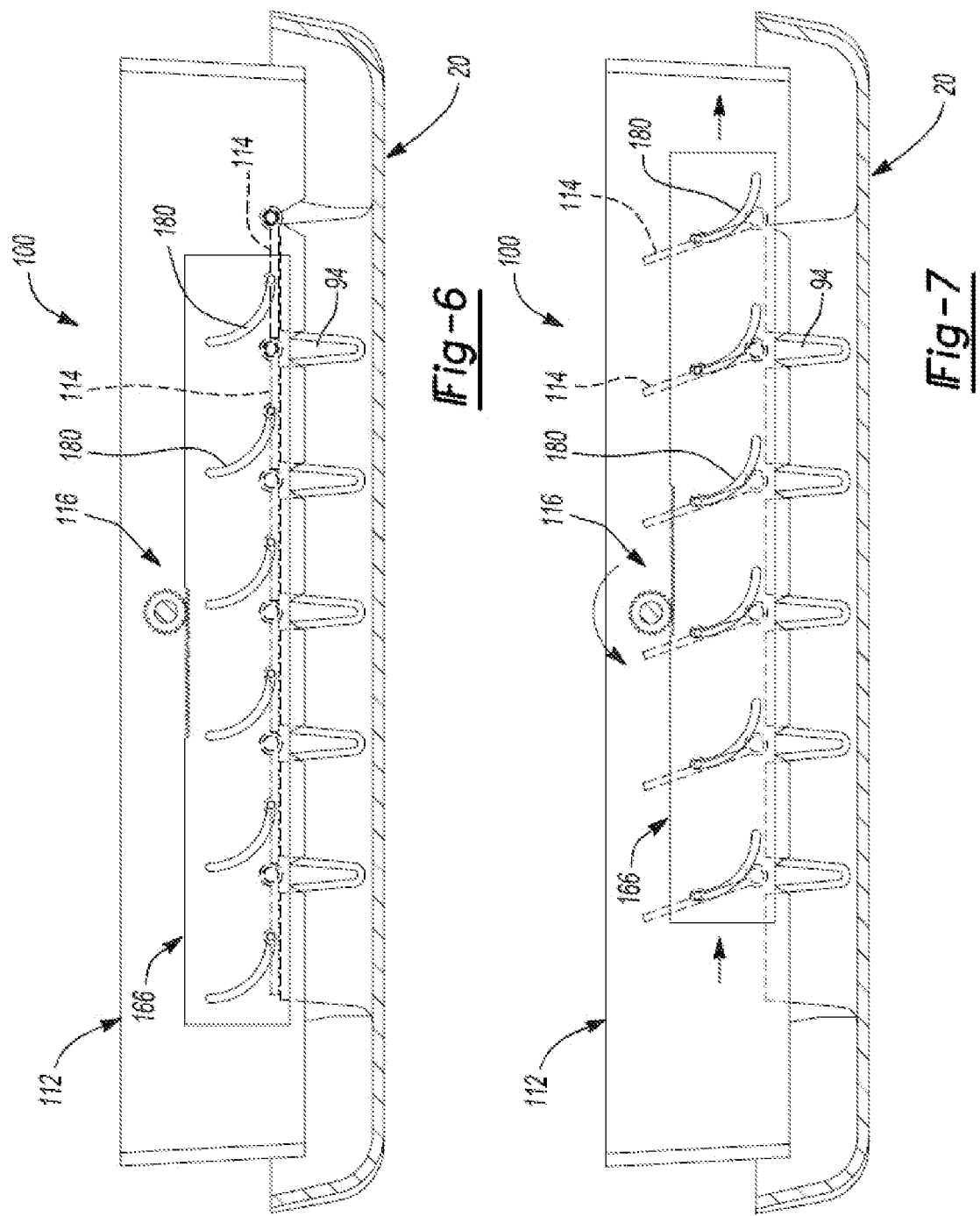

SHUTTER SYSTEM FOR VEHICLE GRILLE

CROSS-REFERENCE TO RELATED APPLICATIONS

This application claims the benefit of U.S. Provisional Application No. 61/386,895, filed on Sep. 27, 2010. The entire disclosure of the above application is incorporated herein by reference.

FIELD

The present disclosure relates to a shutter system, and more particularly, to a shutter system for a grille of a vehicle.

BACKGROUND

This section provides background information related to the present disclosure and is not necessarily prior art.

Many automotive vehicles include a grille mounted to a front end of the vehicle. Grilles are often an integral component of the vehicle's aesthetic appeal and may serve to identify a brand of the vehicle. Aesthetic appeal and marketing considerations can be just as important or more important design factors than the functionality and/or performance of the grille. Accordingly, functionality and/or performance are sometimes compromised in favor of aesthetic design considerations.

SUMMARY

This section provides a general summary of the disclosure, and is not a comprehensive disclosure of its full scope or all of its features.

The present disclosure provides an apparatus that may include a frame, a shutter, and a drive mechanism. The shutter may be connected to the frame and may be pivotable relative thereto between a first position and a second position. The shutter may include a pivot axis and an engagement member. The shutter may restrict airflow through a vehicle grille in the first position and allow airflow through the vehicle grille in the second position. The drive mechanism may drive the shutter between the first and second positions. The drive mechanism may include a drive shaft rotating relative to the frame and a drive member engaging the drive shaft and moving linearly relative to the frame. The drive member may include an arcuate slot slidably engaging the engagement member.

In another form, the present disclosure provides a vehicle that may include a vehicle body, a grille and a shutter assembly. The grille may be mounted to a front end of the vehicle body. The shutter assembly may control airflow through the grille and may include a frame, a plurality of shutters and a drive mechanism. The frame may be mounted to the vehicle proximate the grille. The shutters may be pivotably supported by the frame and may include opposing elongated first and second sides and opposing first and second ends. The drive mechanism may include an actuator driving a drive member. The drive member may be coupled to each of the shutters at an engagement location disposed along the first end between the first and second sides to pivot the shutters relative to the grille between a first position and a second position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is a cross-sectional view of the shutter assembly including a drive mechanism and shutters in a closed position according to the principles of the present disclosure;

FIG. 5 is a cross-sectional view of the shutter assembly including the drive mechanism and shutters in an open position according to the principles of the present disclosure;

FIG. 6 is a cross-sectional view of another shutter assembly including a drive mechanism and shutters in a closed position according to the principles of the present disclosure; and FIG. 7 is a cross-sectional view of the shutter assembly of FIG. 6 including the drive mechanism and shutters in an open position according to the principles of the present disclosure.

Corresponding reference numerals indicate corresponding parts throughout the several views of the drawings.

DETAILED DESCRIPTION

Figure 1:
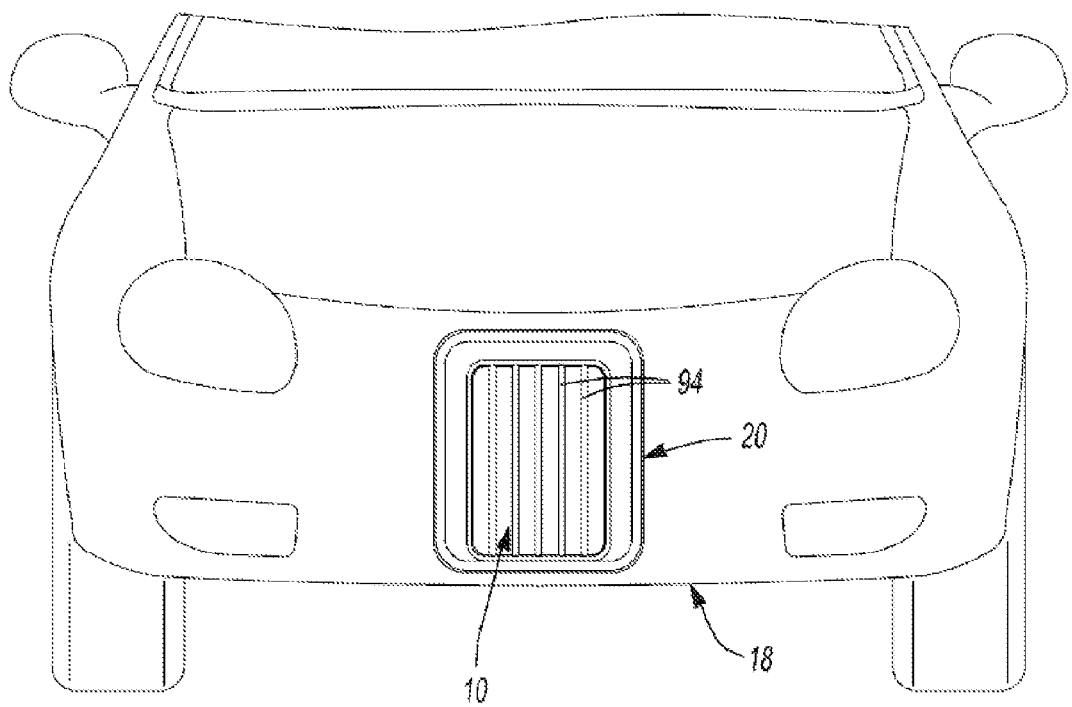
FIG. 1 is a perspective view of a vehicle having a grille and shutter assembly according to the principles of the present disclosure.
Figure 2:
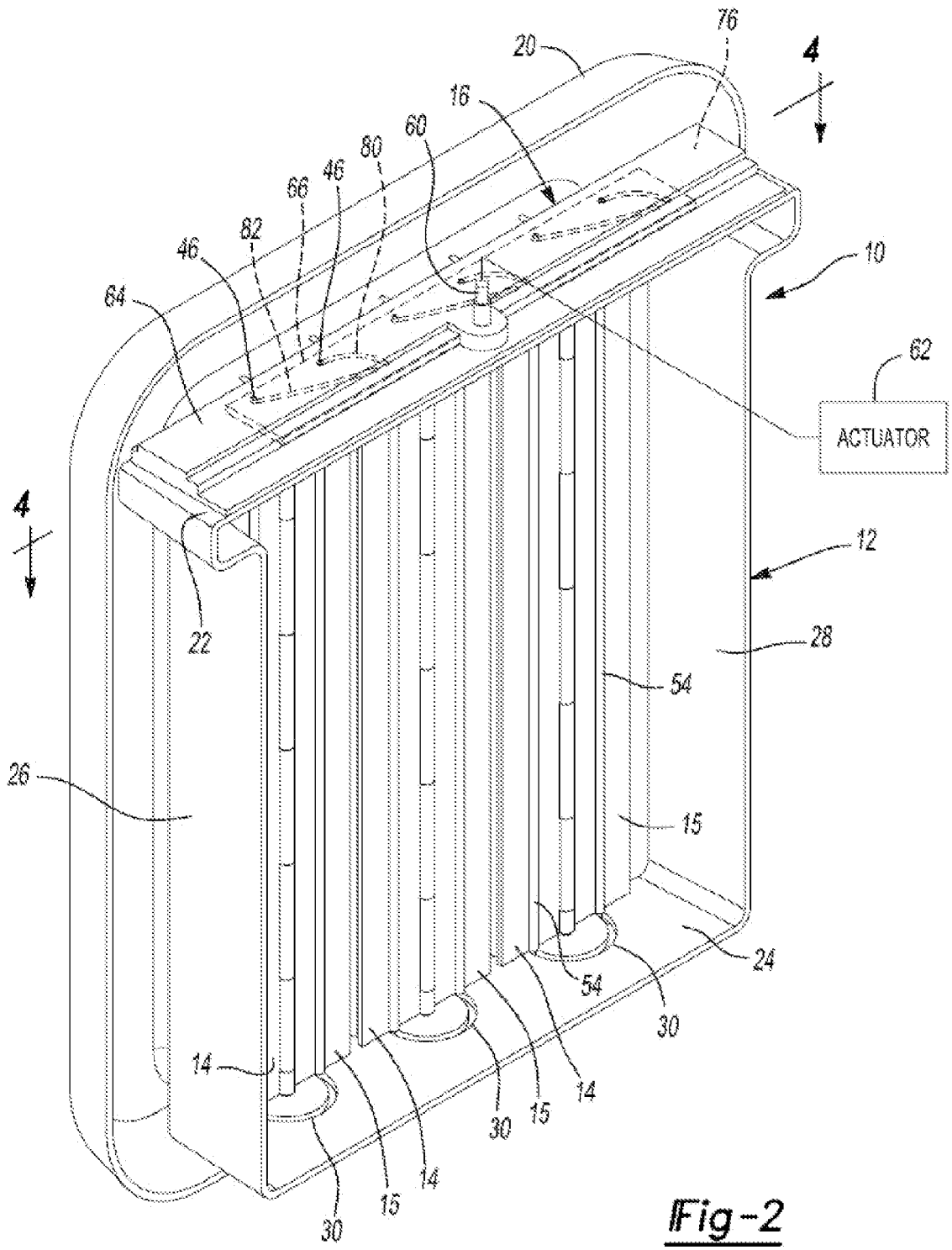
FIG. 2 is a perspective view of the shutter assembly and grille of FIG. 1.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-5, a shutter assembly 10 is provided and may include a frame 12, one or more first louvers or shutters 14, one or more second louvers or shutters 15, and a drive mechanism 16. The shutter assembly 10 may be installed in a front end of a vehicle 18 proximate a grille 20 of the vehicle 18 and may control airflow through the grille 20, as will be subsequently described. It should be appreciated that the vehicle 18 may be any type of vehicle having a grille, including an automotive vehicle such as a car, pickup truck, sport utility vehicle, crossover vehicle, minivan, van, light commercial vehicle, heavy-duty commercial or industrial vehicle, military vehicle, construction or farm equipment or vehicle, or recreational vehicle, for example. Furthermore, it should be appreciated that the vehicle 18, regardless of the type or class of vehicle, could include an internal combustion engine, an electric motor, a hybrid powertrain (e.g., an internal combustion engine and an electric motor) and/or any other power source for powering the vehicle. It is also envisioned that the shutter assembly 10 could be incorporated into a boat or aircraft. In some embodiments, one or more of the frame 12, shutters 14, 15, drive mechanism 16, and grille 20 may be configured as described in commonly assigned U.S. patent application Ser. No. 12/801,403, the disclosure of which is hereby incorporated by reference as if fully set forth herein.

The frame 12 may include a first member 22, a second member 24, a third member 26, and a fourth member 28. The first and second members 22, 24 can be generally parallel to each other and connected to each other by the third and fourth members 26, 28. While the first, second, third and fourth members 22-28 shown in the figures form a generally rectangular shaped frame, in other configurations, the frame 12 could have any other shape to correspond to the shape of the grille 20 of a given vehicle 18.

Figure 3:
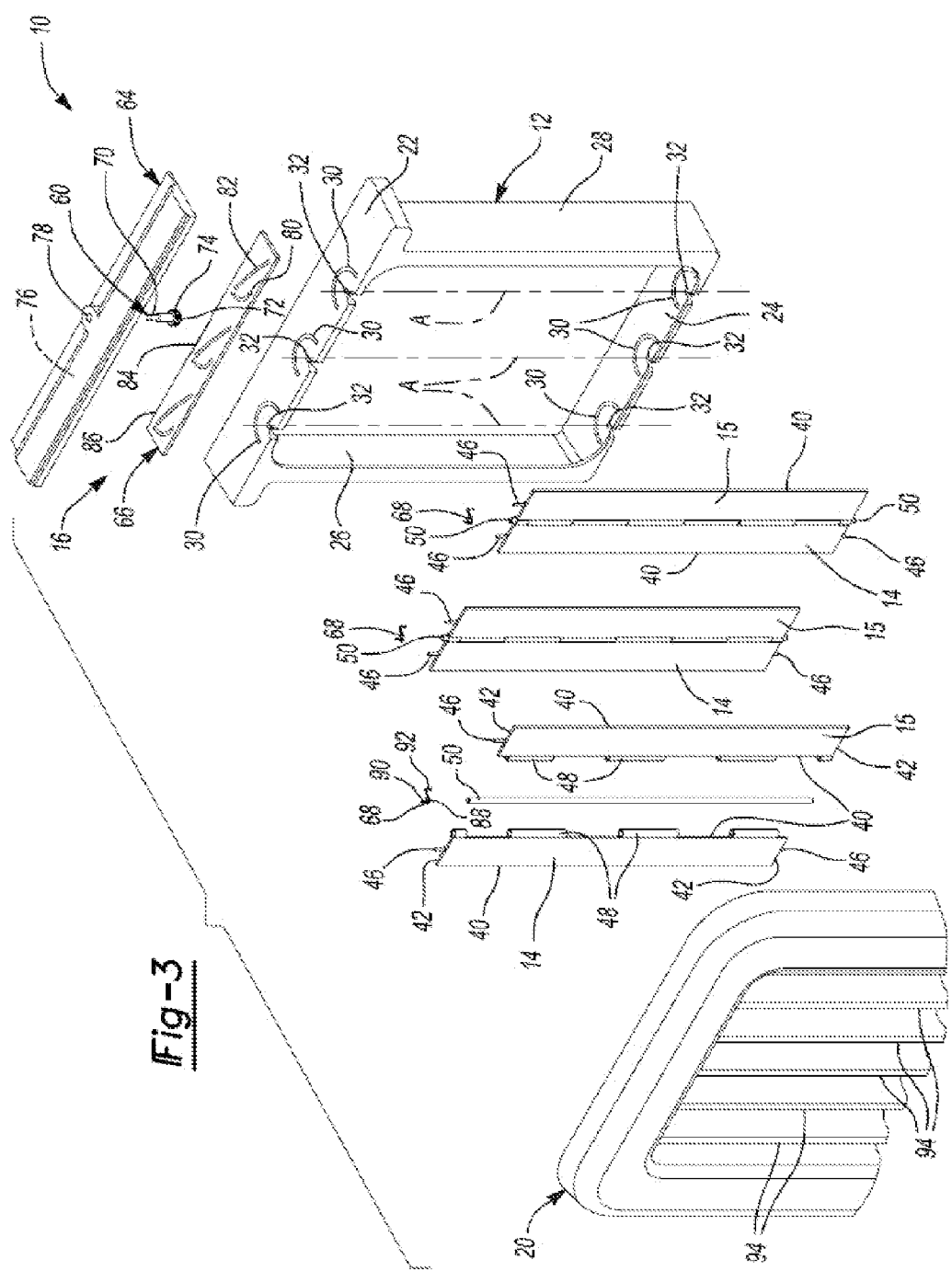
FIG. 3 is an exploded perspective view of the shutter assembly of FIG. 2.

Each of the first and second members 22, 24 may include one or more guide slots 30 and one or more hinge slots 32. Each of the guide slots 30 and hinge slots 32 formed in the first member 22 may be aligned with a corresponding one of the guide slots 30 and hinge slots 32 in the second member 24. The guide slots 30 may include a substantially constant radius and may be substantially semicircular, for example. The semicircular path along which the guide slots 30 extend may be defined by corresponding axes A (FIG. 3) that extend through the hinge slots 32. While the guide slots 30 are shown in FIG. 3 and described above as being substantially semicircular (i.e., the guide slots 30 extend along a path that is about one hundred eighty degrees), in some configurations, the guide slots 30 may extend more or less than one hundred eighty degrees.

The first and second shutters 14, 15 may be generally flat, elongated members that may be arranged in pairs including one of the first shutters 14 and one of the second shutters 15. The sizes and shapes of the shutters 14, 15 may be configured according to the size and shape of the grille 20. Each of the shutters 14, 15 may include a pair of opposing edges 40 and a pair of opposing ends 42 that may be generally perpendicular to the edges 40. Each of the ends 42 may include a guide pin 46 protruding outward therefrom. Each of the guide pins 46 may be disposed approximately halfway between the opposing edges 40, as shown in the figures. Although, in some configurations, the guide pins 46 may be disposed closer to one of the edges 40 that the other edge 40.

Adjacent edges 40 of each one of corresponding first and second shutters 14, 15 may include a plurality of hinge sleeves 48. The hinge sleeves 48 may rotatably engage a hinge pin 50. The hinge pins 50 may rotatably engage corresponding hinge slots 32. In this manner, corresponding shutters 14, 15 in each pair of shutters 14, 15 can rotate relative to each other about the hinge pin 50 between an open position (FIG. 5) and a closed position (FIG. 4). In the open position, the shutters 14, 15 of each of the pairs of shutters 14, 15 may cooperate to form a generally V-shape, as shown in FIG. 5. The guide pins 46 protruding from each of the ends 42 may slidably engage the corresponding guide slots 30.

Each of the shutters 14, 15 may also include a reinforcement rib 54 that may span at least a portion of the length of the shutters 14, 15. The ribs 54 may provide stiffness and structural reinforcement for the shutters 14, 15. In some configurations, the ribs 54 could span across the width of the shutters 14, 15, rather than the lengths of the shutters 14, 15 as shown in the figures. It will be appreciated that the shutters 14, 15 could include additional or alternative structural reinforcement features.

The drive mechanism 16 may drivingly engage the shutters 14, to selectively move the shutters 14, 15 between the open and closed positions. The drive mechanism 16 may include a drive shaft 60, an actuator 62, a cover 64, and a drive member 66. The drive shaft 60 may include a first end 70 and a second end 72 having a geared portion 74. The actuator 62 may be a motor or any other electromechanical device, for example, and may drivingly engage the first end 70 of the drive shaft 60. The actuator 62 may be powered by electrical current received from a battery (not shown) of the vehicle 18, for example, or any other suitable power source. A control module may control operation of the actuator 62.

The cover 64 may be a generally flat, elongated member and may be fixedly mounted to the first member 22 of the frame 12, for example. The cover 64 may include a cavity 76 and a bearing portion 78 rotatably supporting the drive shaft 60. The cavity 76 may at least partially encase the geared portion 74, the drive member 66, the guide slots 30, and/or the hinge slots 32. The cover 64 may protect the drive mechanism 16 from moisture, dirt and/or other debris or foreign objects during operation of the vehicle 18.

The drive member 66 may be a generally flat, elongated member having one or more first arcuate slots 80, one or more second arcuate slots 82, and a plurality of teeth 84. The first and second arcuate slots 80, 82 may be shaped and sized differently from each other. Each of the first arcuate slots 80 may slidably engage the guide pin 46 of a corresponding one of the first shutters 14. Each of the second arcuate slots 82 may slidably engage the guide pin 46 of a corresponding one of the second shutters 15.

The plurality of teeth 84 may be formed in an edge 86 of the drive member 66 and may meshingly engage the geared portion 74 of the drive shaft 60. In this manner, the drive shaft 60 and the drive member 66 may cooperate to form a rack-and-pinion mechanism. Accordingly, rotation of the drive shaft 60 may cause corresponding linear motion of the drive member 66 relative to the drive shaft 60 and the frame 12. The drive member 66 may be slidably mounted to the frame 12 such that some portion of each of the first and second arcuate slots 80, 82 may be aligned with some portion of the corresponding guide slots 30 as the drive member 66 moves between the open and closed positions. In this manner, each of the guide pins 46 may be in slidable engagement with the corresponding guide slot 30 and the corresponding one of the arcuate slots 80, 82, and movement of the drive member 66 forces the guide pins 46 to move relative to the guide slots 30 and the first and second arcuate slots 80, 82, thereby causing the shutters 14, 15 to rotate between the open and closed positions. Configuring the guide pins 46 such that they extend from the midpoints of the shutters 14, 15 (i.e., halfway between opposing edges 40), may lower the stresses and stains that the shutters 14, 15 are subjected to a result of forces applied to the guide pins 46 by the drive member 66 moving between the open and closed positions. While the drive mechanism 16 is described above as being a rack-and-pinion mechanism, in other configurations, the drive mechanism 16 could be a slider-crank linkage or any other three or four bar linkage, for example, or any other suitable mechanism operable to move the shutters 14, 15 between the open and closed positions.

The actuator 62 or the control module may be operable to detect a low-voltage condition where the actuator 62 is receiving a weak or lower than normal supply of electrical current from the battery or other power source. If and when such a condition is detected, the actuator 62 may move the shutters 14, 15 into the open position. In this manner, the shutters 14, 15 can be opened prior to a failure of the actuator 62 and/or a complete loss of electrical power to the actuator 62.

Additionally or alternatively, the drive mechanism 16 can include one or more spring members 68 (FIG. 3) that are operable to move the shutters 14, 15 into the open position in the event that electrical power to the actuator 62 is lost. The spring members 68 may be torsion springs, for example, each having a ring portion 88 and first and second legs 90, 92 extending tangentially outward therefrom. The ring portion 88 may engage the hinge pin 50 and the first and second legs 90, 92 may engage ends 42 of the first and second shutters 14, 15, respectively, for example. Unstressed or resting positions of the first and second legs 90, 92 may form a generally V-shape corresponding to the generally V-shape formed by the first and second shutters 14, 15 when the shutters 14, 15 are in the open position. Accordingly, when the shutters 14, 15 are in the closed position, the first and second legs 90, 92 may be disposed approximately one hundred eighty degrees apart from each other and may bias the shutters 14, 15 toward the open position. Therefore, if and when electrical power to the actuator 62 is lost, the spring members 68 can move the shutters 14, 15 into the open position. It will be appreciated that in some configurations, the spring member 68 could be any other type of spring, such as a compression spring, a tension or extension spring, or a cantilevered spring, for example. One or more spring members could be disposed between adjacent shutters 14, 15, between the shutters 14, 15 and the frame 12, and/or between the frame 12 and the drive member 66, and/or any other suitable location in which the spring members could be configured to bias the shutters 14, 15 and the drive mechanism 16 toward the open position.

With continued reference to FIGS. 1-5, operation of the shutter assembly 10 will be described in detail. As described above, the shutter assembly 10 may be mounted in the vehicle 18 proximate an interior-facing side of the grille 20. The grille 20 may include cross members 94, for example, and/or other functional and/or aesthetic features such as a grid structure, a brand badge, and/or a nameplate, for example. When the shutters 14, 15 are in the closed position, the shutters 14, 15 may block or restrict airflow between the cross members 94. In some embodiments, the hinge pins 50 may be generally aligned with the cross members 94 such that the shutters 14, 15 are substantially concealed when the shutters 14, 15 are in the open position, thereby allowing air to flow between the cross members 94. Because the shutters 14, 15 are substantially concealed in the open position, the shutter assembly 10 can be positioned closer to the grille 20, thereby improving the ability of the shutter assembly 10 to reduce the coefficient of drag on the vehicle 18.

When the vehicle 18 is travelling at a relatively low speed, the shutter assembly 10 may be kept in the open position. When the vehicle 18 is travelling at relatively high speeds (e.g., at or about highway speeds), the control module may cause the actuator 62 to rotate the drive shaft 60, which in turn causes the drive member 66 to move linearly from the open position to the closed position (i.e., from left to right relative to the view shown in FIG. 2). As the drive member 66 moves from the open position to the closed position, the guide pins 46 slide along the guide slots 30 and the corresponding arcuate slots 80, 82 from the open position to the closed position. In the closed position, the shutters 14, 15 may substantially block or restrict airflow through the grille 20, thereby reducing drag on the vehicle due to wind resistance.

It will be appreciated that the control module can be calibrated to optimize airflow through the grille 20 by adjusting the positions of the shutters 14, 15 between the open and closed positions while optimizing the intended aesthetic features of the grille 20. For example, the control module may cause the drive mechanism 16 to move the shutters 14, 15 to an intermediate position between the open and closed positions. The control module may control the drive mechanism 16 based on an algorithm that accounts for vehicle speed, wind speed, a temperature of the vehicle's engine and/or motor, a temperature of engine/motor coolant, and/or a temperature of air conditioning refrigerant, for example, and/or other factors and vehicle operating parameters. Such parameters may be monitored by the vehicle's on-board instruments (e.g., global positioning system (GPS), a speedometer or oil temperature sensor) and/or one or more dedicated pressure, temperature, and/or noise sensors communicating the with the control module.

The speed at which the shutters 14, 15 move between the open and closed positions can be tuned and/or varied by tuning and/or varying the angle or slope of curvature of the first and/or second arcuate slots 80, 82. For example, the steeper the slope of the arcuate slots 80, 82, the faster the corresponding shutter 14, 15 will move between the open and closed positions for a given linear velocity of the drive member 66. In this manner, the arcuate slots 80, 82 can be configured such that the respective rotational speeds of the first and second shutters 14, 15 can be different from each other. Additionally or alternatively, the control module controlling the actuator 62 may vary the speed of the actuator 62 to increase or decrease the linear speed of the drive member 66 and the rotational speeds of the shutters 14, 15.

With reference to FIGS. 6 and 7, a shutter assembly 100 is provided and may include the frame 112, one or more shutters 114 and the drive mechanism 116. The structure and function of the frame 112, the shutters 114 and the drive mechanism 116 may be substantially similar to the frame 12, the shutters 14 and the drive mechanism 16 described above, apart from several exceptions noted below.

For example, the shutters 114 may be independently connected to the frame 112 such that each of the shutters 114 corresponds to an individual hinge pin 50. In some configurations, all of the shutters 114 may rotate in the same direction when moving from the open position to the closed position and in the same direction when moving from the closed position to the open position. Accordingly, a drive member 166 of the drive mechanism 116 may include a plurality of arcuate slots 180 all having the same shape and size. Although, in some embodiments, the shape (i.e., the angle or slope) of one or more of the arcuate slots 180 may differ from one or more of the other arcuate slots 180. In this manner, the rotational speed of one or more of the shutters 114 may differ from one or more of the other shutters 114.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An apparatus for use with a vehicle grille comprising:
a frame;
a pair of shutters connected to said frame and pivotable relative thereto between a first position and a second position about a pivot axis, each of said shutters including an engagement member, said shutters restricting airflow through the vehicle grille in said first position and allowing airflow through the vehicle grille in said second position; and
a drive mechanism driving said shutters between said first and second positions, said drive mechanism including a drive shaft rotating relative to said frame and a drive member engaging said drive shaft, said drive member moving linearly relative to said frame, said drive member including an arcuate slot slidably engaging one of said engagement members,
wherein said shutters are connected to said frame for pivotal motion in opposite directions relative to each other between said first and second positions.

2. The apparatus of claim 1, wherein said engagement member is spaced apart from said pivot axis.

3. The apparatus of claim 1, wherein said pair of shutters form a generally V-shape during movement between said first and second positions.

4. The apparatus of claim 1, wherein said drive member includes a pair of arcuate slots, each of said arcuate slots correspond to each of said pair of shutters, said pair of arcuate slots having different arcuate shapes from each other.

5. The apparatus of claim 1, wherein said drive shaft and said drive member cooperate to form a rack-and-pinion mechanism.

6. The apparatus of claim 1, wherein each of said shutters includes a reinforcement rib.

7. The apparatus of claim 1, further comprising a spring member configured to urge at least one of said shutters toward said second position.

8. The apparatus of claim 1, further comprising a protective member at least partially encasing said drive member.

9. A vehicle comprising:
a vehicle body including a front end;
a grille mounted to said front end; and
a shutter assembly controlling airflow through said grille and including a frame, a plurality of shutters and a drive mechanism, said frame being mounted to said vehicle proximate said grille, said shutters being pivotably supported by said frame and including opposing elongated first and second sides and opposing first and second ends, said drive mechanism including an actuator driving a drive member, said drive member being coupled to each of said shutters at an engagement location disposed along said first end and between said first and second sides to pivot said shutters relative to said grille between a first position and a second position,
wherein said drive mechanism includes a drive shaft rotating relative to said frame and engaging said drive member to move said drive member linearly relative to said frame, and wherein said drive shaft includes a first geared portion and said drive member includes a second geared portion engaging said first geared portion.

10. The vehicle of claim 9, wherein said shutter assembly includes a plurality of pins and said drive member includes first and second arcuate slots slidably engaging said pins, each of said pins engaging a corresponding one of said shutters at said engagement location.

11. The vehicle of claim 9, wherein said shutter includes a reinforcement rib.

12. The vehicle of claim 9, further comprising a spring member configured to urge said shutter toward said second position.

13. The vehicle of claim 9, wherein a first one of said shutters pivots into said first position in a first direction relative to said frame and a second one of said shutters pivots into said first position in a second direction relative to said frame.

14. The vehicle of claim 9, wherein said shutter assembly includes a protective member at least partially encasing said drive member.

15. An apparatus for use with a vehicle grille comprising:
a frame;
a pair of shutters connected to said frame and pivotable relative thereto between a first position and a second position, each of said shutters including an engagement member, said shutters restricting airflow through the vehicle grille in said first position and allowing airflow through the vehicle grille in said second position; and
a drive mechanism driving said shutters between said first and second positions, said drive mechanism including a drive shaft rotating relative to said frame and a drive member engaging said drive shaft, said drive member moving linearly relative to said frame, said drive member including a pair of arcuate slots, each of said arcutate slots slidably engaging said engagement member of a corresponding one of said shutters, said pair of arcuate slots having different arcuate shapes from each other.

16. The apparatus of claim 15, wherein said engagement members are spaced apart from said pivot axis.

17. The apparatus of claim 15, wherein said drive shaft and said drive member cooperate to form a rack-and-pinion mechanism.

18. The apparatus of claim 15, further comprising a spring member configured to urge both of said shutters toward said second position.

19. The apparatus of claim 15, further comprising a protective member at least partially encasing said drive member.

20. The apparatus of claim 15, wherein each of said shutters includes a reinforcement rib.

* * * * *